Patented Oct. 14, 1930

1,778,503

UNITED STATES PATENT OFFICE

HUGH C. LORD, OF ERIE, PENNSYLVANIA

VIBRATION-DAMPENING MOUNTING  REISSUED

Application filed January 10, 1927. Serial No. 160,223.

In many situations vibration dampening is desirable, as for example motor mountings of different types. Rubber has been used for this purpose and commonly rubber so used has been placed under compression in order to secure the parts in their proper relation. While rubber under compression has some dampening effect depending on the amount of compression as ordinarily compressed this dampening effect is negligible. By placing the rubber under tension its dampening effect may be very much increased and if it is given initial tension a small amount of rubber may be utilized for supporting the load. It is preferable to so arrange the rubber that the major thrust on the mounting subjected to vibration is resisted through the action of shear on the rubber and in the present invention the perferred form is so arranged. Here both the gravity thrust of the motor and the torque thrust of the motor operate on the rubber in shear.

I have exemplified my invention as a mounting for an automobile motor and have illustrated the preferred form of carrying out my invention. Features and details of the invention will appear from the specification and claims.

The invention is illustrated in the accompanying drawings as follows:—

Figure 1:
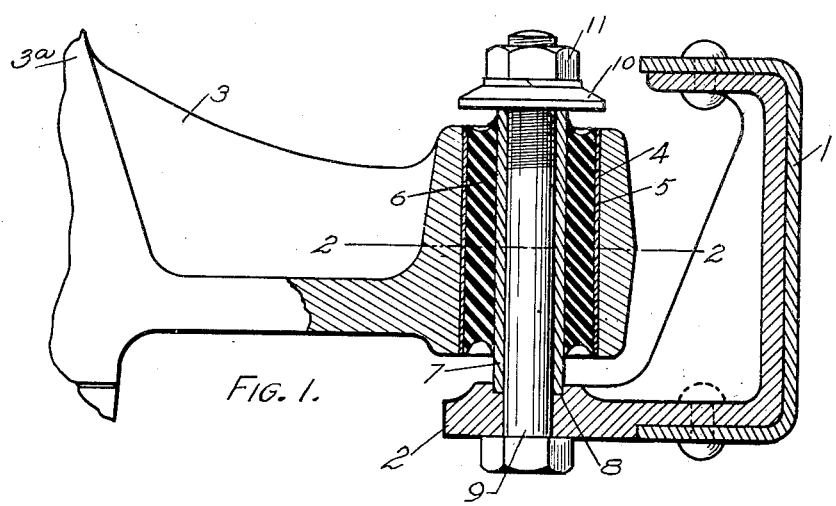
Figures 2, 3:
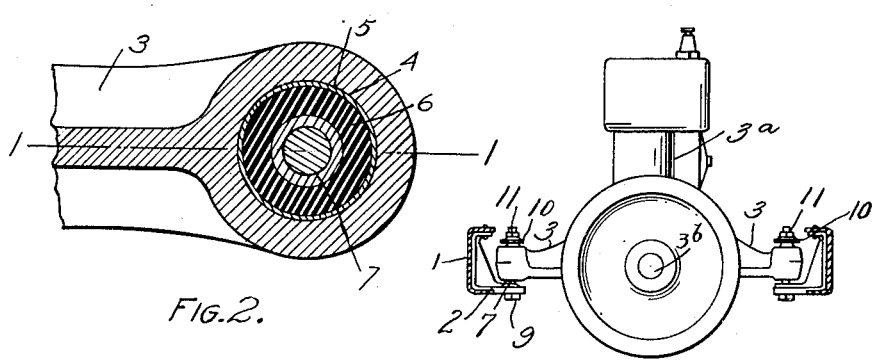

Fig. 1 shows a sectional view of the mounting on the line 1—1 in Fig. 2.

Fig. 2 a sectional view of the mounting on the line 2—2 in Fig. 1.

Fig. 3 is an end elevation of an ordinary automobile engine with the mountings in place.

1 marks the channel of the automobile frame, 2 a supporting bracket secured to the channel, and 3 an arm extending from the engine frame for supporting the engine 3ª, the motor being of the ordinary automobile type delivering its power through the shaft crank 3ᵇ.

An opening 4 is formed in the arm 3 preferably in a vertical direction. A steel shell 5 is pressed into this opening preferably with a pressed fit. Rubber 6 is secured to the shell 5 by bonding during vulcanization and to a central sleeve 7 also by vulcanization.

The sleeve 7 rests on a seat 8 in the bracket 2 and a bolt 9 extends through the bracket and through the sleeve and is provided with a nut 11 at its upper end which operates on a washer 10 larger than the opening 4 on the upper end and clamps the sleeve on the seat 8.

By bonding the rubber during vulcanization the rubber in cooling shrinks and puts all the rubber in the mounting under initial tension. By arranging the rubber mounting with its shells in a vertical direction all the rubber is equally engaged in carrying the load and the load is suspended through the rubber medium, the rubber being equally stressed in every radial direction. The vertical arrangement is, therefore, preferable. In any case the rubber should be so proportioned to the load that all the rubber remains under tension under the action of the load. Thus the load, or engine is free to move in any direction in response to vibrations but is restrained within close limits.

Further the rubber with the axis of the joint arranged in a vertical direction, as illustrated is subjected to shear and this manner of taking the thrust is also very sensitive to periodic vibrations, and in a very efficient manner insulates the member which is provided with periodic vibration producing means, such as the engine, from the other member which is connected with such vibrating member.

It will be understood that such vibrating members have a very definite period and the idea is to have the mounting out of step with the period of the vibrating member. The period of vibration of a mounting arranged as here illustrated is such that it may be readily arranged to accomplish this purpose in a comparatively small space.

What I claim as new is:—

1. In a vibration dampening mounting, the combination of a supporting and a supported member, one of said members being provided with periodic vibration producing means and the other of said members being insulated therefrom at the mounting, said members having a normally fixed relation except for said vibrations, said members having walls with extended opposing surfaces in substantial alinement with the major thrust under vibration between the members; and a mounting of resilient rubber in tension resisting engagement with said opposing surfaces and resisting the major thrust through shearing action on the rubber between its surfaces and the respective opposing surfaces of the said members, the rubber being directly interposed between the engaging surfaces.

2. In a vibration dampening mounting, the combination of a supporting and a supported member, one of said members being provided with periodic vibration producing means and the other of said members being insulated therefrom at the mounting, said members having a normally fixed relation except for said vibrations, said members having walls with extended opposing surfaces in substantial alinement with the major thrust under vibration between the members; and a mounting of uncompressed resilient rubber in tension resisting engagement with said opposing surfaces and resisting the major thrust through shearing action on the rubber between its surfaces and the respective opposing surfaces of the said members, the rubber being directly interposed between the engaging surfaces.

3. In a vibration dampening mounting, the combination of a supporting and a supported member, one of said members being provided with periodic vibration producing means and the other of said members being insulated therefrom at the mounting, said members having a normally fixed relation except for said vibrations, said members having walls with extended opposing surfaces in substantial alinement with the major thrust under vibration between the members; and a resilient rubber member connected with said surfaces through vulcanization, said rubber being under initial tension and resisting the mapor thrust through shearing action and tension on the rubber between its surfaces and the respective opposing surfaces of the said members, the rubber being directly interposed between the engaging surfaces.

4. In a vibration dampening mounting, the combination of a supporting and a supported member, one of said members being provided with periodic vibration producing means, said members having a normally fixed relation except for said vibrations, one of said members having walls with securing surfaces at opposite sides of the mounting and an intermediate member between said opposing walls and with opposing surfaces; and a mounting of resilient rubber in tension resisting engagement with the surfaces of the opposite sides and the opposing surfaces of the intermediate member and resisting the major thrust through shearing action on the rubber between its surfaces and the respective opposing surfaces of the said member, the rubber being directly interposed between the engaging surfaces.

5. In a vibration dampening mounting, the combination of a supporting and a supported member, one of said members being provided with periodic vibration producing means, said members having a normally fixed relation except for said vibrations, one of said members having walls with securing surfaces at opposite sides of the mounting and an intermediate member between said opposing walls and with opposing surfaces; and a mounting of resilient rubber connected through vulcanization with the surfaces of the opposite sides and the opposing surfaces of the intermediate member and resisting the major thrust through shearing action and tension on the rubber between its surfaces and the respective opposing surfaces of the said members, the rubber being directly interposed between the engaging surfaces.

6. In a vibration dampening mounting, the combination of a supporting and a supported member, one of said members being provided with periodic vibration producing means and the other of said members being insulated therefrom at the mounting, said members having a normally fixed relation except for such vibrations, one of said members having an annular wall and the other of said members a wall intermediate the annular wall, said walls presenting opposing surfaces; and a mounting of resilient rubber in tension resisting engagement with said opposing surfaces and resisting the major thrust under vibration on the mounting through shearing action on the rubber between its surfaces and the respective opposing surfaces of the said members, the rubber being directly interposed between the engaging surfaces.

7. In a vibration dampening mounting, the combination of a supporting and a supported member, one of said members being provided with periodic vibration producing means and the other of said members being insulated therefrom at the mounting, said members having a normally fixed relation except for such vibrations, one of said members having an annular wall and the other of said members a wall intermediate the annular wall, said walls presenting opposing surfaces; and a mounting of resilient rubber under initial tension secured to the opposing surfaces by vulcanization and resisting the major thrust under vibration on the mounting through shearing action on the rubber between its surfaces and the respective opposing surfaces of the said members, the rubber being directly interposed by the engaging surfaces.

8. In a vibration dampening mounting, the combination of a supporting and a supported member, one of said members being provided with periodic vibration producing means and the other of said members being insulated therefrom at the mounting, said members having a normally fixed relation except for such vibrations, one of said members having an annular wall with an axis in substantial alinement with the major thrust under vibration and the other of said members a wall intermediate the annular wall, said walls presenting opposing surfaces; and a mounting of resilient rubber in tension resisting engagement with said surfaces and resisting the major thrust under vibration on the mounting through shearing action on the rubber between its surfaces and the respective opposing surfaces of the said members, the rubber being directly interposed between the engaging surfaces.

9. In a vibration dampening mounting, the combination of a supporting and a supported member, one of said members being provided with periodic vibration producing means and the other of said members being insulated therefrom at the mounting, said members having a normally fixed relation except for such vibrations, one of said members having an annular wall with an axis in substantial alinement with the major thrust under vibration and the other of said members a wall intermediate the annular wall, said walls presenting opposing surfaces; and a mounting of resilient rubber secured to the opposing surfaces by vulcanization and resisting the major thrust through the mounting through shearing action on the rubber between its surfaces and the respective opposing surfaces of the said members, the rubber being directly interposed between the engaging surfaces.

10. In a vibration dampening mounting, the combination of a supporting and a supported member, one of said members being provided with periodic vibration producing means and the other of said members being insulated therefrom at the mounting, said members having a normally fixed relation except for such vibrations, one of said members having an annular wall and the other of said members a wall intermediate the annular wall, said walls presenting opposing surfaces; and a mounting of resilient rubber under initial tension secured to said surfaces by surface bonding and resisting the major thrust under vibration through the tension of the rubber, the rubber being directly interposed between the opposing surfaces.

11. In a vibration dampening mounting, the combination of a supporting and a supported member, one of said members being provided with periodic vibration producing means and the other of said members being insulated therefrom at the mounting, said members having a normally fixed relation except for such vibrations, one of said members having an annular wall and the other of said members a wall intermediate the annular wall, said walls presenting opposing surfaces; and a mounting of resilient rubber under initial tension secured to said surfaces by surface bonding and resisting the major thrust in the direction of the axis of the annular wall, the rubber being directly interposed between the opposing surfaces.

12. In a vibration dampening mounting, the combination of a supporting and a supported member, one of said members being provided with periodic vibration producing means and the other of said members being insulated therefrom at the mounting, said members having a normally fixed relation except for said vibrations, said members having walls with extended vertical opposing surfaces, and a mounting of resilient rubber in tension resisting engagement with said opposing surfaces and sustaining the major portion of the load through shearing action on the rubber between its surfaces and the respective opposing surfaces of the said members, the rubber being directly interposed between the opposing vertical engaging surfaces.

13. In a vibration dampening mounting, the combination of a supporting and a supported member, one of said members being provided with periodic vibration producing means and the other of said members being insulated therefrom at the mounting, said members having a normally fixed relation except for said vibrations, said members having walls with extended vertical opposing surfaces, and a resilient rubber member connected with said surfaces through vulcanization, said rubber being under initial tension and sustaining the major portion of the load through shearing action and tension on the rubber between its surfaces and the respective opposing surfaces of said members, the rubber being directly interposed between the opposing vertically connected surfaces.

14. In a vibration dampening mounting, the combination of a supporting and a supported member, one of said members being provided with periodic vibration producing means, and the other of said members being insulated therefrom at the mounting, said members having a normally fixed relation except for said vibration, one of said members having walls with securing vertical surfaces at opposite sides of the mounting and an intermediate member between said opposing walls, said intermediate member having opposing vertical surfaces; and a mounting of resilient rubber in tension-resisting engagement with the surfaces of the opposite sides and the opposing surfaces of the intermediate member and sustaining the major portion of the load through shearing action on the rubber between its surfaces and the respective opposing surfaces on the members, the rubber being directly interposed between the engaging surfaces.

15. In a vibration dampening mounting, the combination of a supporting and a supported member, one of said members being provided with periodic vibration producing means and the other of said members being insulated at the mounting therefrom, said members having a normally fixed relation except for said vibrations, one of said members having an annular wall and the other of said members a wall intermediate the annular wall, said walls presenting opposing vertical surfaces; and a mounting of resilient rubber in tension-resisting engagement with said opposing surfaces and sustaining the major portion of the load through shearing action on the rubber between its surfaces and the respective opposing surfaces of the said members, the rubber being directly interposed between the engaging surfaces.

16. In a vibration dampening mounting, the combination of a supporting and a supported member, one of said members being provided with periodic vibration producing means and the other of said members being insulated therefrom at the mounting, said members having a normally fixed relation except for said vibrations, one of said members having an annular wall and the other of said members a wall intermediate the annular wall, said walls presenting vertical opposing surfaces; and a mounting of resilient rubber under initial tension secured to said surfaces by surface bonding and sustaining the major portion of the load through the rubber directly interposed between said surfaces.

In testimony whereof I have hereunto set my hand.

HUGH C. LORD.